United States Patent [19]

Hartmann et al.

[11] 4,000,336

[45] Dec. 28, 1976

[54] PRODUCTION OF MAGNETIC RECORDING MEDIA

[75] Inventors: Job Werner Hartmann, Ludwigshafen; Hans Joerg Hartmann, Freinsheim; Hermann Roller, Ludwigshafen; Joachim Hack, Frankenthal; Heinrich Hartmann, Limburgerhof, all of Germany

[73] Assignee: Badische Aniln- & Soda-Fabrik Aktiengesellschaft, Ludwigshafen (Rhine), Germany

[22] Filed: Nov. 6, 1974

[21] Appl. No.: 521,476

Related U.S. Application Data

[63] Continuation of Ser. No. 314,927, Dec. 14, 1972, abandoned.

[30] Foreign Application Priority Data

Dec. 16, 1971 Germany ............................ 2162440

[52] U.S. Cl. ................................ 427/128; 428/900
[51] Int. Cl.$^2$ ........................................ H01F 10/02
[58] Field of Search ........................... 427/127–132, 427/47, 48; 428/900

[56] References Cited

UNITED STATES PATENTS

| | | | |
|---|---|---|---|
| 3,526,598 | 1/1970 | Lemke | 117/235 X |
| 3,586,630 | 6/1971 | Ingersoll | 117/235 X |
| 3,597,495 | 8/1971 | Sekmakas et al. | 117/161 X |
| 3,634,252 | 1/1972 | Graham | 117/235 X |
| 3,649,541 | 3/1972 | Ingersoll | 117/235 X |

*Primary Examiner*—Bernard D. Pianalto
*Attorney, Agent, or Firm*—Johnston, Keil, Thompson & Shurtleff

[57] ABSTRACT

In a process for the production of magnetic recording media by applying a layer of a dispersion of a magnetic pigment in a polyurethane-containing binder and a solvent to non-magnetic supports, small amounts of ethylenically unsaturated polymerizable carboxylic acids or their anhydrides with or without copolymerizable monomers are added and polymerized during dispersion of the magnetic pigment. Recording media produced by this process exhibit excellent output level, coefficient of friction and electrical resistance values and have particularly good operational durability.

10 Claims, No Drawings

PRODUCTION OF MAGNETIC RECORDING MEDIA

This is a continuation, of application Ser. No. 314,927 filed Dec. 14, 1972 and now abandoned.

The present invention relates, in a process for the production of magnetic recording media, to a special method of preparing the dispersion of the magnetic pigment in a binder and solvent.

The continual development of tape transports for computers, video recording and reproducing machines and special audio recording and reproducing machines which employ high tape speeds has resulted in an increasing need for improved and, in particular, abrasion-resistant magnetic coatings. A wide variety of binders has been described and proposed for improving the properties of magnetic recording media.

Polyurethanes such as are disclosed for example in German Printed Application No. 1,106,959 have proved to be a relatively advantageous base for binder systems. Unfortunately such polyurethanes are not suitable as sole binder because they do not always impart sufficient hardness to the surface of the magnetic layer. When they are used alone, the magnetic coatings are frequently unable to withstand the thermal and mechanical stresses which occur in field use.

There have therefore been many proposals to improve the properties of polyurethanes by suitable measures, particularly by combining them with other binders. German Printed Application No. 1,269,661 for example discloses the use of a mixture of polyurethanes and polyesters for the production of magnetic recording media. U.S. Pat. No. 3,144,352 describes the combination of vinylidene chloride/acrylonitrile copolymers with polyurethanes as binders. The combination of polyurethanes with vinyl chloride/vinyl acetate copolymers is disclosed in German Printed Application No. 1,282,700. According to German Printed Application No. 1,295,011 polyurethanes are combined with high molecular weight epoxy resins. However, these proposals bring about an increase in the thermoplasticity of the magnetic coatings, which impairs their behavior at temperatures above room temperature.

German Published Application No. 2,037,605 recommends the use of a polyurethane/polymer compound containing free hydroxyl groups as polyurethane component in a binder combination. However, water take-up by the magnetic coating is promoted by the use of such compounds, resulting in poor service characteristics under conditions of high temperature and humidity.

German Printed Application No. 1,269,180 discloses a process for the production of magnetic recording media using a polyurethane binder in which the magnetic pigment is treated with an isocyanate compound and the isocyanate compound is subsequently reacted with a bifunctional compound.

One of the drawbacks of using polyurethanes as binders, particularly when macromolecule formation is partially effected in the magnetic dispersion, is the tendency of the coating mixture to gel, the coating mixture consequently having a relatively short pot life. A further drawback of using polyurethane binder systems is the frequent appearance of nodules at the surface of the dried and cured magnetic coating. It was precisely this disadvantage that German Printed Application No. 1,269,180 tried to overcome, but owing to the presence of traces of water $CO_2$ was readily formed during the production of the magnetic dispersion, which resulted in the formation of troublesome bubbles in the magnetic coating.

An object of the present invention is to provide magnetic recording media having magnetic coatings exhibiting favorable output level, coefficient of friction and electrical resistance values while overcoming the abovementioned disadvantages.

A further object of the invention is to provide magnetic recording media having magnetic coatings exhibiting particularly good operational durability.

We have now found that the production of magnetic recording media having advantageous properties by preparing a dispersion of finely divided magnetic pigment in a binder consisting essentially of polyurethanes with the addition of organic solvents and the optional addition of conventional additives, applying a layer of the dispersion to the base followed by drying can be advantageously carried out by adding prior to or during milling 1.5 to 12 parts by weight of at least one ethylenically unsaturated, polymerizable, carboxyl-containing compound having 3 to 20 carbon atoms per 100 parts by weight of magnetic pigment and effecting polymerization during milling.

Particularly suitable monoethylenically and polyethylenically unsaturated compounds according to the invention are unsaturated mono- and dicarboxylic acids having 3 to 20 carbon atoms, preferably 3 to 5 carbon atoms, acrylic acid, methacrylic acid, fumaric acid, maleic acid, crotonic acid and linolenic acid being preferred, at least one of which is preferably added in an amount of from 1.5 to 9 parts by weight per 100 parts by weight of magnetic pigment. The acids may be used in the form of their anhydrides, particularly maleic acid in the form of maleic anhydride.

It has proved to be advantageous to also add free-radical-generating compounds in amounts of from 0.05 to 2 parts by weight per 100 parts by weight of ethylenically unsaturated compound prior to or during dispersion to initiate the polymerization reaction. Particularly suitable polymerization initiators are peroxides and diazo compounds. Cyclohexane peroxide, tert-butyl peroxide, methyl ethyl ketone peroxide, azodiisobutyronitrile, cumene hydroperoxide and benzoyl peroxide for example have proved to be advantageous.

It has also proved to be expedient to add copolymerizable, monoolefinically unsaturated monomers, particularly styrene or methyl vinyl ether, in addition to the ethylenically unsaturated carboxylic acids used according to the invention, preferably in approximately equimolar amounts, with reference to the unsaturated carboxylic acids, during the free-radical-initiated polymerization reaction.

The polyurethanes used in the binder are known in principle and are of the type usually obtained by reacting an organic diisocyanate with monomeric or polymeric organic compounds having two terminal hydroxyl groups, e.g. polyalkyleneether glycols and polyalkylenearyleneether gylcols, particularly with linear polyesters having terminal hydroxyl groups which are prepared in a known manner by esterification of dihydric alcohols such as ethylene glycol, diethylene glycol, propylene glycol and 1,4-butylene glycol or mixtures thereof with aliphatic dicarboxylic acids, such as adipic acid, glutaric acid, suberic acid and sebacic acid, or with linear polyester amides having terminal hydroxyl groups.

Polyurethanes such as are described in German Printed Application No. 1,106,959 are preferred. These are linear polyester urethanes exhibiting both thermoplastic and elastomeric properties which can be prepared by reacting a polyester of linear aliphatic dicarboxylic acid of 4 to 6 carbon atoms, such as adipic acid, and a glycol of 4 to 10 carbon atoms, such as butanediol-1,4, with a diphenylalkane diisocyanate, such as p,p'-diisocyanatodiphenylmethane, preferably in the presence of glycol of 4 to 10 carbon atoms, particularly butanediol-1,4. Suitable polyester methanes have a tensile strength of from 300 to 430 kg/cm² and an elongation at break of from 400 to 700%.

If desired, the mechanical properties of the binder used can be further improved by the addition of other binders, such as polycarbonates and curable phenol-formaldehyde resins, in amounts smaller than the amount of polyurethane, e.g. in amounts of from 10 to 40% by weight of the total amount of the binder system. Advantageous polycarbonates are those which are prepared from a bis-(hydroxyaryl)-alkane as dihydroxy compound, have a molecular weight of from about 25,000 to 75,000; a tensile strength at yield of from 600 to 650 kg/cm²; an elongation at yield of 7%; a ball indentation hardness (10 sec) of from 900 to 1050 kg/cm²; a modulus of elasticity of from 21 to 24 ×10³ kg/cm²; and a melting point of from 220° to 230° C.

Polycarbonates which wholly or predominantly contain the recurring unit

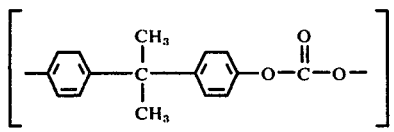

in the molecule and exhibit the above physical data are preferred. According to the invention mixtures of 70 to 80 parts by weight of polyurethane and 20 to 30 parts by weight of polycarbonate are preferred.

The preferred polyurethanes used in the production of the magnetic dispersion, which is carried out in a conventional manner, are advantageously soluble in organic solvents, such as tetrahydrofuran, dioxane and dimethyl formamide, or in mixtures of such solvents with esters, ketones and aromatics.

Moreover, small amounts of dispersing agents, fillers and/or lubricants can be added during dispersion of the magnetic pigment or during production of the magnetic coating.

Examples of suitable additives are metallic soaps such as salts of fatty acids or isomerized fatty acids and metals of main groups I to IV of the periodic system, stearic acid, fatty acid esters, waxes, silicone oils and carbon black. These additives are generally used in amounts not exceeding 3% by weight with reference to the magnetic layer.

If desired, conductive powder such as conductive carbon and the like can be added to improve the electrical resistance of the magnetic coating. These additives also have a positive effect on other properties of the magnetic coating, particularly its mechanical properties.

There may be used as magnetic pigments those conventionally employed for this purpose, e.g. γ-iron(III) oxide, particulate magnetite, ferromagnetic chromium dioxides, ferromagnetic metals and metal alloy pigments such as alloys of iron, cobalt and nickel. Usually from about 1 to 8 parts of magnetic pigment are used per part of binder.

The coating mixture can be prepared in a conventional manner, advantageously in dispersing apparatus, e.g. a tube mill or stirred ball mill employing, for example, sand or steel balls as dispersing medium. Milling is usually effected for a total period of from about 10 to 100 hours at a temperature of from 15° to 30° C. The coating mixture is milled in a vessel closed from the atmosphere and, after removal therefrom, can be completely freed by filtering from any clumps which may have formed. The resulting coating mixture, when stored in such a vessel, is suitable for the production of magnetic coatings over a relatively long period of time.

It is advantageous to effect pre-mixing for a period of from about 2 to 6 hours and then to add the binder and other additives such as lubricants and dispersing agents. The object of this premixing step is to contact the magnetic particles with the ethylenically unsaturated polymerizable compounds. However, the polyurethane binder can be present from the very beginning of the milling operation. In the production of the magnetic coating according to the invention the ethylenically unsaturated compounds should advantageously polymerize during the dispersing step; this can be accomplished by adding initiators or initiator/activator systems which initiate polymerization reactions under the dispersing conditions. However, this addition is not necessary because the heat generated during dispersion and the reactive centers at the surface of the magnetic particles initiate polymerization.

Coating of a suitable base film, e.g. polyvinyl chloride and polyethylene terephthalate films, can be carried out in a conventional manner, for example by spraying, dipping, transfer roll coating, gravure roll coating and knife coating. Other typical bases which can be used are made of paper, cellulose acetate and nylon. The thickness of the applied coating is from about $0.3 \times 10^{-3}$ cm to $12.9 \times 10^{-3}$ cm. The magnetic coating is then dried with hot air for example to remove the solvent, the thickness of the resulting dry coating being from 2 to 35μ.

Depending on the intended application the magnetic particles can be oriented in a preferred direction by applying a strong magnetic field immediately downstream of the coating device.

The invention is further illustrated by the following Examples in which parts by volume bear the same relation to parts by weight as the liter to the kilogram.

EXAMPLE 1

A steel tube mill having a capacity of 6000 parts by volume was charged with 8000 parts by weight of steel balls having a diameter of 5 mm and with the following mixture:

700 parts by weight of acicular γ-iron(III) oxide; 42 parts by weight of conductive carbon; 10.5 parts by weight of lecithin; 7 parts by weight of an aliphatic branched alcohol having a melting point of +15° C; 1111 parts by weight of an 18% solution of 720 parts by weight of a polyurethane (prepared from adipic acid, butanediol-1,4 and 4,4'-diisocyanatodiphenylmethane) in 3280 parts by weight of tetrahydrofuran; 1.4 parts by weight of polydimethylsiloxane; 750 parts by weight of tetrahydrofuran; 1.0 part by weight of methyl ethyl ketone peroxide; 16.5 parts by weight of styrene; 18.5 parts by weight of maleic acid; and 0.04 part by weight of cobalt naphthenate, dispersion being carried out for 72 hours to give a magnetic dispersion A according to the invention.

For comparison purposes a magnetic dispersion B was prepared in exactly the same way but omitting the styrene and maleic acid.

Each of the magnetic dispersions A and B was filtered under pressure through filter paper and applied to $25\mu$ polyethylene terephthalate film in a conventional manner to give a magnetic coating $10.5\mu$ in thickness after drying at about 90° C. The fluid magnetic dispersions had a viscosity of 600 cps and a yield value of 320 dynes/cm$^2$. The magnetic particles were oriented immediately after the coating step by applying a magnetic field.

The coercive force, the residual induction in the direction of tape motion and in the transverse direction, and the ratio of residual induction in the direction of tape travel to residual induction in the crosswise direction, i.e. the orientation ratio, which is a measure of the orientatability of the magnetic particles, of the magnetic recording media made in this way were then determined.

The magnetic recording medium prepared with magnetic dispersion A had a coercive force of 290 oersteds, a residual induction in the direction of tape motion of 1100 gauss and an orientation ratio of 2.3, whereas the recording element prepared with magnetic dispersion B exhibited a coercive force of 288 oersteds, a residual induction in the direction of tape travel of 1010 gauss and an orientation ratio of 2.05.

EXAMPLE 2

A steel tube mill having a capacity of 6000 parts by volume was charged with 8000 parts by weight of steel balls 5 mm in diameter and with the following mixture:

700 parts by weight of acicular $\gamma$-iron(III) oxide; 38.5 parts by weight of conductive carbon; 35 parts by weight of acrylic acid; 0.2 part by weight of cyclohexanone peroxide; 7 parts by weight of a higher aliphatic alcohol having a melting point of about $-10°$ C; 1110 parts by weight of an 18% solution of 1296 parts by weight of a polyurethane (prepared from adipic acid, butanediol-1,4 and 4,4'-diisocyanatodiphenylmethane) and 324 parts by weight of a polycarbonate (prepared from diphenylolpropane and phosgene) in 2220 parts by weight of dioxane and 5160 parts by weight of tetrahydrofuran; and 1.4 parts by weight of polydimethylsiloxane, dispersion being effected for 72 hours to give a magnetic dispersion A according to the invention.

For comparison purposes a magnetic dispersion B was prepared in exactly the same way except that the acrylic acid and cyclohexanone peroxide were replaced by 10.5 parts by weight of soybean lecithin.

It was found that in the case of a magnetic recording medium prepared with a magnetic dispersion containing 35 parts by weight of soybean lecithin as dispersing agent that the said agent exuded from the magnetic coating and formed deposits on the magnetic heads, tape guides, etc.

Each of the magnetic dispersions A and B was filtered under pressure through filter paper, applied to polyethylene terephthalate film with the aid of a knife coater and dried at a temperature of about 80° to 100° C. The thickness of the dry magnetic coating was from 10 to $12\mu$. The coated webs were then passed between heated polished steel rolls (50° C), the magnetic coating being slightly compressed.

The following properties were measured:
1. Surface roughness

The web coated with magnetic dispersion A according to the present invention exhibited a surface roughness of $0.15\mu$, whereas the one coated with magnetic dispersion B, although made in an identical manner, had a surface roughness of $0.25\mu$, i.e. surface smoothness is improved considerably by the use of the binder mixture of the invention.

For the following tests the coated webs were slit into magnetic tapes ½ inch wide. The resulting magnetic tapes were tested on conventional IBM tape transports.
2. Output level The read voltage was determined as a function of the write current. The read voltages read off from the curves obtained with specific write currents were referred to the IBM master tape and the deviation given in %.

The results obtained are given in the following Table:

|  | 200 fci | 800 fci | 1600 fci | 3200 fci |
| --- | --- | --- | --- | --- |
| Magnetic tape prepared with dispersion A | +6% | +5% | +12% | +6% |
| Magnetic tape prepared with comparison dispersion B | −1% | −2% | +12% | −6% |

3. Coefficient of friction

Lengths of tape, to one end of which a load of 65 g had been applied, said end hanging freely, were pulled horizontally over steel and brass rods 1 inch in diameter at a rate of 1 inch/min. The torque applied to the rods was recorded by a measuring instrument calibrated in g. The values obtained in the case of the magnetic coating prepared from dispersion A were 55 g (steel rod) and 49 g (brass rod). The corresponding figures in the case of the magnetic coating prepared from the comparison product B were 65 and 55.

4. Electrical resistance

The magnetic coating prepared from magnetic dispersion A exhibited an electrical resistance of 3000 megohms per square as compared with 9000 megohms per square in the case of the coating prepared from magnetic dispersion B, i.e. a marked improvement.

5. Durability

In each case the properties of a 100 m length of tape (recording density 3200 fci) were assessed after 1600 passes. The same tape transport that was used in test 2 was employed here. The magnetic recording medium prepared with magnetic dispersion A exhibited an extremely small increase in the number of write and read errors, high output uniformity, a few scratches in the surface of the magnetic coating and no deposits on the tape guides. By contrast, in the case of the recording element prepared with dispersion B output uniformity had decreased distinctly, there were a large number of scratches in the tape surface and deposits had formed to an appreciable extent on the tape guides.

EXAMPLE 3

A steel tube mill having a capacity of 6000 parts by volume was charged with 8000 parts by weight of steel balls having a diameter of 5 mm and with the following mixture:

700 parts by weight of acicular γ-iron(III) oxide; 42 parts by weight of conductive carbon; 10.5 parts by weight of lecithin and 63 parts by weight of methacrylic acid, dispersion being effected for 48 hours.

To this mixture there were then added 700 parts by weight of a 20% binder solution consisting of 16% by weight of the polyurethane described in Example 2, 4% by weight of a high molecular weight epoxy resin and 80% by weight of tetrahydrofuran; 7 parts by weight of an ester prepared from an aliphatic carboxylic acid and an aliphatic alcohol having a melting point of about 5° C; 1.4 parts by weight of polydimethylsiloxane; 1.9 parts by weight of azodiisobutyronitrile; 1.5 parts by weight of cyclohexanone peroxide; and 0.06 part by weight of cobalt naphthenate. The whole was dispersed for a further 48 hours to give a magnetic dispersion A according to the invention.

For comparison purposes a magnetic dispersion B was prepared in exactly the same way but omitting the methacrylic acid.

Each of the magnetic dispersions A and B was filtered under pressure through filter paper and applied to polyester tape base material as described in Example 2, the acicular magnetic particles being aligned with the aid of a powerful magnet. Following drying, a magnetic coating having a thickness of 13μ was obtained. The resulting coated webs were calandered and then slit into tapes of the required width.

The following properties were measured:

1. Magnetic properties

The magnetic recording medium prepared with magnetic dispersion A had a residual induction of 1130 gauss in the direction of tape motion and a residual induction of 495 gauss in the transverse direction, the orientation ratio being 2.29. The recording element prepared with magnetic dispersion B exhibited a residual induction of 1030 gauss in the direction of tape travel and a residual induction of 602 in the crosswise direction; in this case the orientation ratio was 1.69. These results show that the magnetic particles contained in the magnetic dispersion according to the invention can be oriented much more easily than those of the comparison dispersion.

2. Anchorage

The degree to which the magnetic coatings adhere to the tape base was determined with the aid of adhesive tape. The magnetic coating prepared from magnetic dispersion A exhibited much better adhesion to the base than that prepared from the comparison product B.

3. Abrasion resistance

After the accelerated life test described in Example 2 the magnetic coating prepared from dispersion A had a virtually unmarked surface, whereas the surface of the coating prepared from coating mixture B exhibited a large number of scratches in the direction of tape motion.

We claim:

1. A process for the production of magnetic recording media by preparing a dispersion of finely divided magnetic pigment in a binder consisting essentially of polyurethanes prepared by reacting a polyester of a linear aliphatic dicarboxylic acid of 4 to 6 carbon atoms and a glycol of 4 to 10 carbon atoms with a diphenylalkane diisocyanate in the presence of a glycol of 4 to 10 carbon atoms with the addition of organic solvents, applying a layer of the dispersion to the base followed by drying, wherein 1.5 to 12 parts by weight of at least one ethylenically unsaturated, polymerizable, carboxyl-containing compound having 3 to 5 carbon atoms is added per 100 parts by weight of magnetic pigment prior to or during milling and polymerization of said compound is effected during milling.

2. A process as claimed in claim 1 wherein 1.5 to 9 parts by weight of at least one ethylenically unsaturated, polymerizable, having 3 to 20 carbon atoms compound having 3 to 20 carbon atoms are added per 100 parts by weight of magnetic pigment.

3. A process as claimed in claim 1 wherein the ethylenically unsaturated, polymerizable, carboxyl-containing compound used is selected from the group consisting of acrylic acid, methacrylic acid.

4. A process as claimed in claim 1 wherein free-radial-generating compounds are added in amounts of from 0.05 to 2 parts by weight per 100 parts by weight of ethylenically unsaturated, polymerizable, carboxyl-containing compound.

5. A process as claimed in claim 1 wherein the binder used is a polyester urethane derived from adipic acid, butanediol-1,4 and 4,4'-diisocyanatodiphenylmethane.

6. A process as claimed in claim 1 wherein copolymerizable, monoolefinically unsaturated monomers are added in addition to the ethylenically unsaturated, polymerizable, carboxyl-containing compound.

7. A process as claimed in claim 1 wherein at least one additive selected from the group consisting of dispersing agents, fillers, and lubricants is added to the dispersion in an amount up to 3% by weight with reference to said layer.

8. Magnetic recording media as prepared by the process of claim 1 wherein said base is a film selected from the group consisting of polyvinyl chloride and polyethylene terephthalate.

9. A process as claimed in claim 1 wherein said carboxyl-containing compound is acrylic acid.

10. A process as claimed in claim 1 wherein said carboxyl-containing compound is methacrylic acid.

* * * * *

UNITED STATES PATENT AND TRADEMARK OFFICE
CERTIFICATE OF CORRECTION

PATENT NO. : 4,000,336
DATED : December 28, 1976
INVENTOR(S) : Job W. Hartmann et al.

It is certified that error appears in the above—identified patent and that said Letters Patent are hereby corrected as shown below:

In Column 8, Lines 1 and 2 of Claim 4, delete " ... wherein free-radial-generating ... " and substitute -- ... wherein free-radical-generating ... --

Signed and Sealed this

Seventh Day of June 1977

[SEAL]

Attest:

RUTH C. MASON
Attesting Officer

C. MARSHALL DANN
Commissioner of Patents and Trademarks